(12) United States Patent
Stoe et al.

(10) Patent No.: US 11,590,891 B2
(45) Date of Patent: Feb. 28, 2023

(54) CONTROL SYSTEM FOR A MACHINE

(71) Applicant: Caterpillar Paving Products Inc., Brooklyn Park, MN (US)

(72) Inventors: Terry R. Stoe, Champlin, MN (US); Andrew J. Steinbach, Oswego, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 456 days.

(21) Appl. No.: 16/744,636

(22) Filed: Jan. 16, 2020

(65) Prior Publication Data

US 2021/0221289 A1 Jul. 22, 2021

(51) Int. Cl.
| | |
|---|---|
| *B60Q 9/00* | (2006.01) |
| *E01C 19/48* | (2006.01) |
| *G01D 5/12* | (2006.01) |
| *G01S 13/87* | (2006.01) |
| *G01S 17/08* | (2006.01) |

(52) U.S. Cl.
CPC .............. *B60Q 9/008* (2013.01); *E01C 19/48* (2013.01); *E01C 2301/00* (2013.01); *G01D 5/12* (2013.01); *G01S 17/08* (2013.01)

(58) Field of Classification Search
None
See application file for complete search history.

(56) References Cited

U.S. PATENT DOCUMENTS

| | | | |
|---|---|---|---|
| 9,633,563 B2* | 4/2017 | Gharsalli | G08G 1/166 |
| 9,802,531 B2 | 10/2017 | Salter et al. | |
| 10,246,087 B2 | 4/2019 | Mitchell et al. | |
| 2012/0287277 A1* | 11/2012 | Koehrsen | H04N 7/181 |
| | | | 348/148 |
| 2017/0147958 A1 | 5/2017 | Hatfield et al. | |
| 2018/0170369 A1* | 6/2018 | Mitchell | E02F 9/262 |
| 2018/0178342 A1 | 6/2018 | Russell | |
| 2018/0293534 A1 | 10/2018 | Ueda | |
| 2019/0071074 A1 | 3/2019 | Gokan et al. | |
| 2020/0150650 A1* | 5/2020 | Jarlengrip | E02F 9/245 |

FOREIGN PATENT DOCUMENTS

| | | |
|---|---|---|
| CN | 106529881 A | 3/2017 |
| CN | 109447547 A | 3/2019 |
| DE | 10338756 A1 | 7/2005 |
| DE | 19936357 A1 | 6/2008 |
| EP | 3090900 A1 | 11/2016 |
| JP | 5003593 B2 | 6/2012 |

* cited by examiner

*Primary Examiner* — Ig T An
*Assistant Examiner* — Mahmoud M Kazimi
(74) *Attorney, Agent, or Firm* — Bookoff McAndrews, PLLC

(57) ABSTRACT

A control system for a machine includes a machine, a plurality of proximity sensors coupled to the machine, and a controller in communication with the plurality of proximity sensors. The controller is configured to activate and monitor proximity information from the proximity sensors during a containerization mode and indicate an alert if the proximity information is below a threshold distance.

20 Claims, 5 Drawing Sheets

CONTROL SYSTEM FOR A MACHINE

TECHNICAL FIELD

The present disclosure relates generally to a control system for a machine, and more particularly, to a containerization assistance and control system for a machine.

BACKGROUND

The present disclosure relates to construction machines that are containerized—loaded and/or driven into shipping containers. Construction machines are typically large machines. When loading a construction machine into a shipping container, there may be very little space on the sides of the construction machine. As a result, it may be necessary for multiple individuals to be positioned around the machine to assist the operator in loading and/or driving the machine into the shipping container. Additionally, the interiors of shipping containers are often dark and, as the machine is being loaded into the shipping container, the machine may further darken the interior of the shipping container by blocking exterior light from illuminating the interior of the shipping container, which may further complicate the loading and/or unloading of the machine from a shipping container and/or the securing of the machine within the shipping container.

U.S. Patent Application Publication No. 2019/071074, filed by Gokan et al. and published on Mar. 7, 2019 ("the '074 application"), describes a vehicle with a control and alert system. The system of the '074 application uses image detection to detect objects and executes an automatic brake control based on the detected objects. However, the control and alert system of the '074 application is limited to stopping the vehicle based on the presence of an object and does not help ensure the vehicle is maintaining a desired path or maintaining a desired distance from one or more objects or surfaces as the vehicle is being containerized.

The control system of the present disclosure may solve one or more of the problems set forth above and/or other problems in the art. The scope of the current disclosure, however, is defined by the attached claims, and not by the ability to solve any specific problem.

SUMMARY

In one aspect, a control system for a machine may include a machine, a plurality of proximity sensors coupled to the machine, and a controller in communication with the plurality of proximity sensors. The controller may be configured to activate and monitor proximity information from the proximity sensors during a containerization mode and indicate an alert if the proximity information is below a threshold distance.

In another aspect, a control system for a machine may include a plurality of proximity sensors, and a controller operatively coupled to each of the plurality of proximity sensors. In response to an activation of a containerization mode signal, the controller may be configured to activate one or more of the proximity sensors and monitor information from the one or more of the proximity sensors. The controller may be configured to indicate an alert if the controller detects an alert condition.

In yet another aspect, a method of controlling a machine may include receiving a signal to set the machine in a containerization mode, activating a plurality of proximity sensors positioned on the machine, monitoring the proximity sensors for an alert condition, wherein the alert condition includes one or more proximity sensors indicating a measured distance that is below a threshold, and indicating the alert condition visually on a user interface

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," and "approximately" are used to indicate a possible variation of ±10% in a stated value. Although the current disclosure will be described with reference to a paving machine, this is only exemplary. In general, the current disclosure can be applied as to any machine, such as, for example, a paver finisher, asphalt finisher or compactor, a wheel loader (e.g., a medium wheel loader), a motor grader, a backhoe loader, or another machine or vehicle that may be loaded into a container or other small and/or dark space or structure.

Figure 1A:
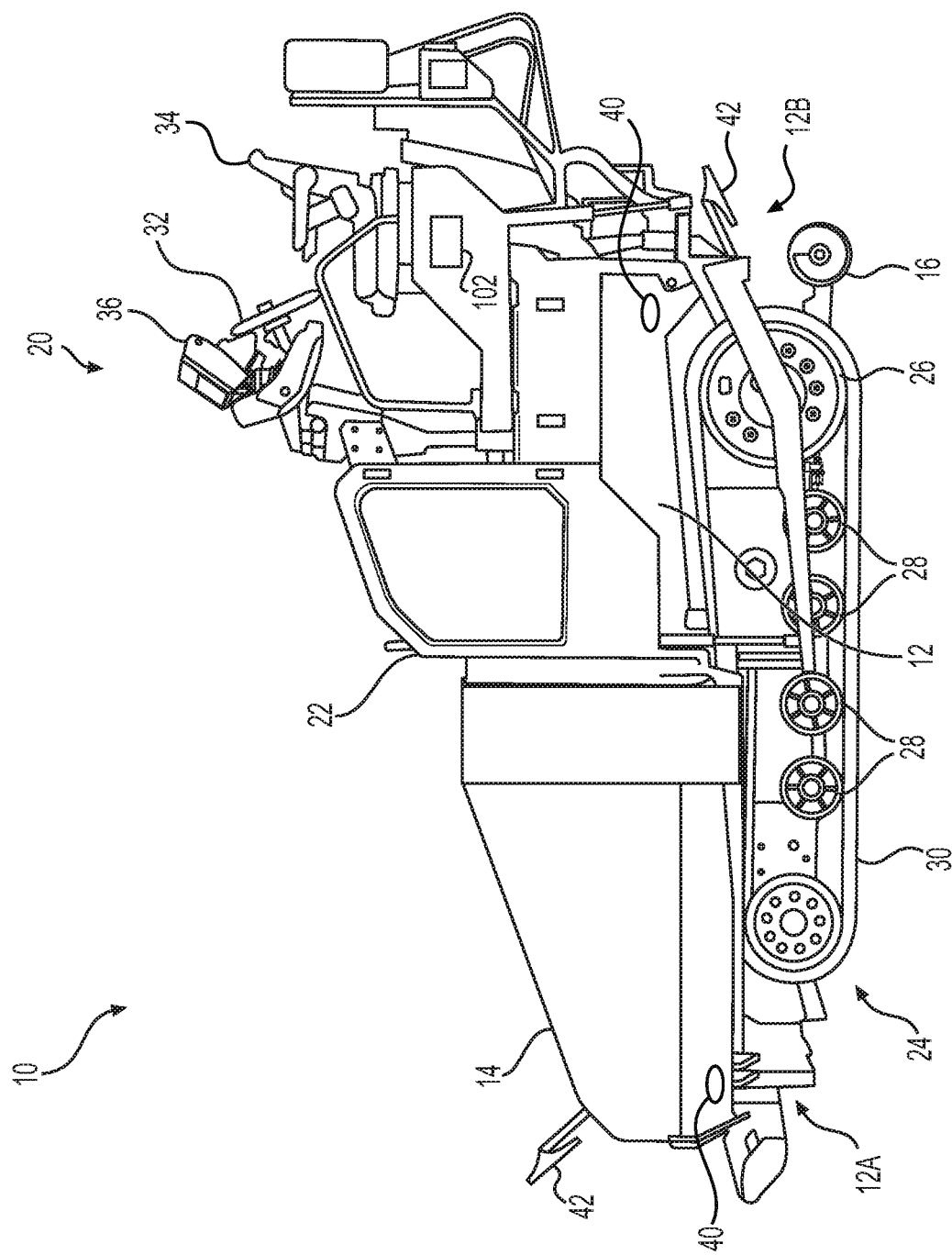
FIG. 1A is a side view of an exemplary machine.
Figure 1B:
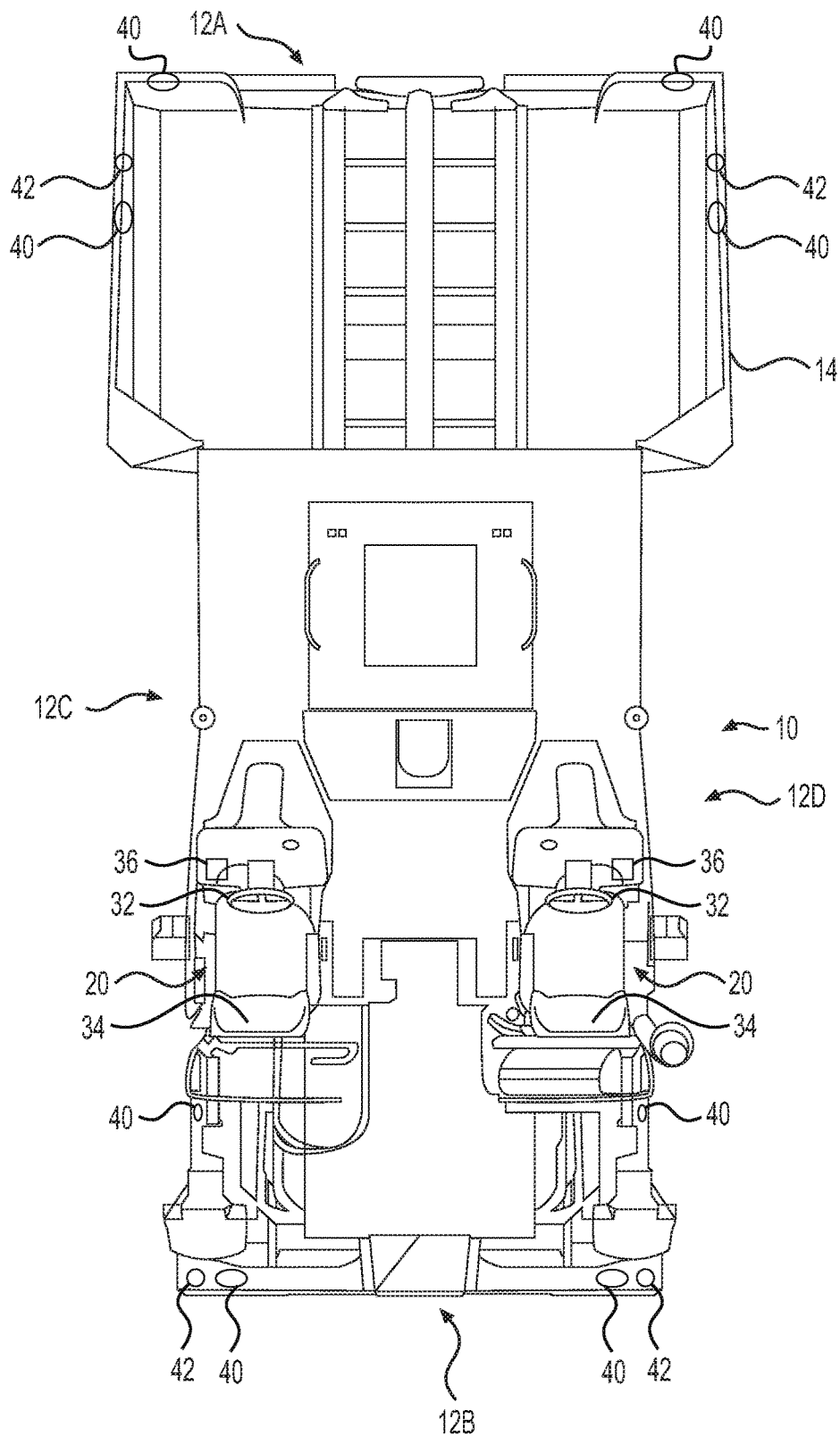
FIG. 1B is a top view of the exemplary machine, according to aspects of this disclosure.

FIG. 1A illustrates a side view of an exemplary machine 10, for example, an asphalt paver, and FIG. 1B illustrates a top view of machine 10, according to the present disclosure. Machine 10 may be any size paver with any paving width, or may be any construction machine, as discussed above. Machine 10 includes a frame 12, including a front 12A, a rear 12B, a left 12C, and a right 12D. If machine 10 is a paving machine, as shown, front 12A may include a hopper 14, and rear 12B may include an auger 16. Machine 10 may also include a screed, but the screed may also be removed before loading machine 10 into a container (i.e., containerized) or not coupled to machine 10 until delivery.

Machine 10 may also include an operator station 20, from which an operator may maneuver and control machine 10. As shown in FIG. 1B, machine 10 may include two operator stations 20, each of which may include a steering wheel 32 and a chair 34. Machine 10 may be propelled by an engine assembly 22 to power a drive assembly 24, which, in the case where machine 10 is a paving machine, may include a drive wheel 26, one or more idlers 28, and tracks 30. Alternatively, drive assembly 24 may include wheels or another drive mechanism.

Machine 10 may also include one or more control panels 36, for example, one or more operator control dashboard displays/interfaces positioned in operator station 20, on another portion of machine, or remote from machine 10.

Control panels 36 may control or display one or more aspects of machine 10 via a controller 102, for example, with a display screen and one or more buttons, switches, touch screens, keyboards, joysticks, etc. Machine 10 also includes a plurality of sensing and/or detecting elements to assist in monitoring and/or controlling machine 10.

As shown in FIGS. 1A and 1B, machine 10 may include one or more proximity sensors 40. One or more proximity sensors 40 may be positioned on the front and/or rear portions of machine 10, and may be positioned on the right and/or the left sides of machine 10. In one aspect, as shown in FIG. 1B, machine 10 includes one proximity sensor 40 in a front right portion, a front left portion, a rear right portion, and a rear left portion. Machine 10 may also include one or more proximity sensors 40 in central portions, on one or more sides of machine 10, for example, aligned with operator station 20 and/or with engine assembly 22. In one aspect, proximity sensors 40 may be positioned on the side portions (and not the front or rear portions) of machine 10. For example, proximity sensors 40 may be positioned on the widest portion(s) of machine 10 (e.g., the maximum width of machine 10), or portions of machine 10 that are wider than other portions of machine 10.

Figure 2:
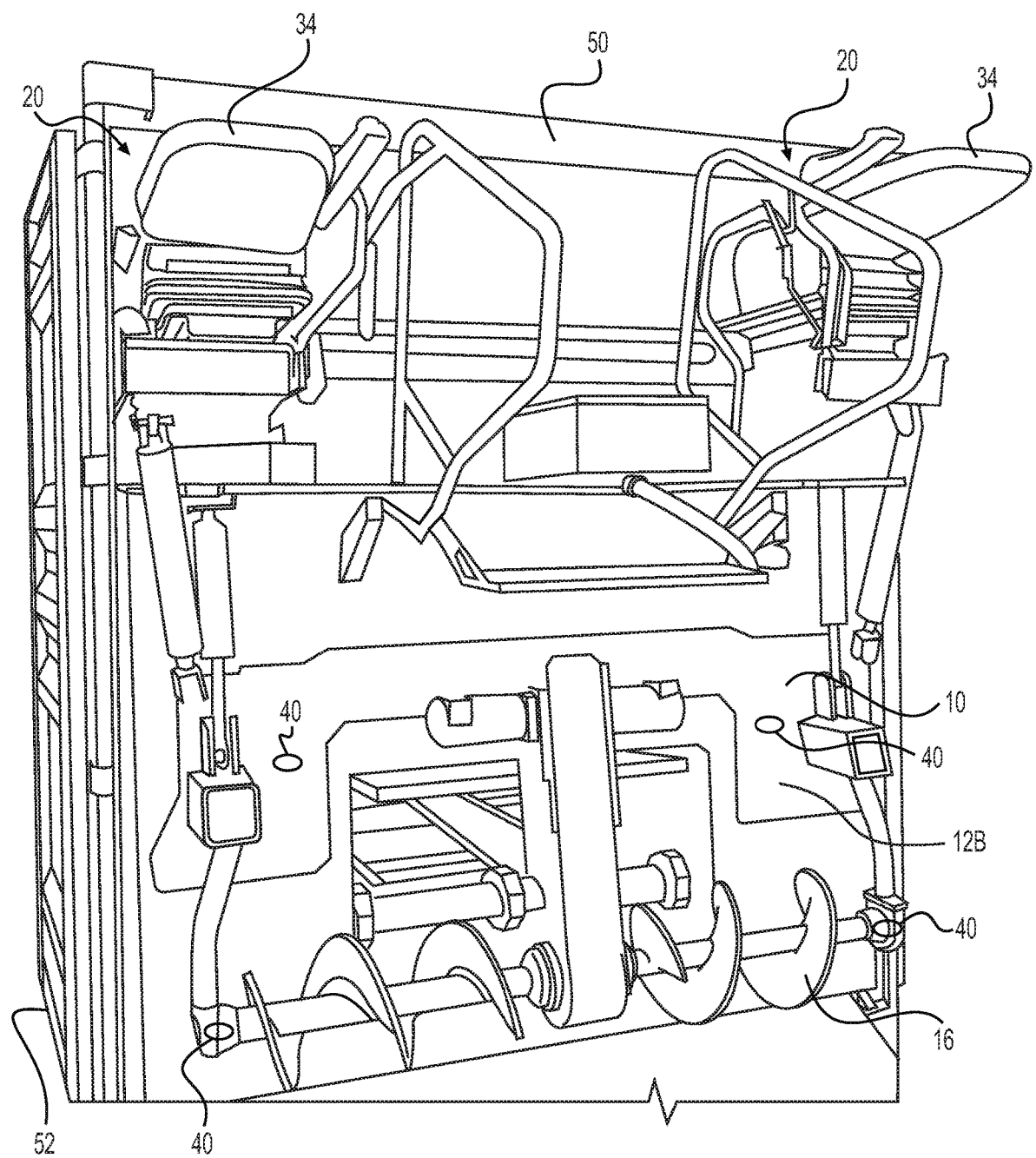
FIG. 2 is a rear view of the machine being loaded into a container, according to aspects of this disclosure.

In these aspects, proximity sensors 40 may be positioned on outermost components and/or portions of machine 10. For example, one or more proximity sensors 40 may be positioned on the right and left sides of hopper 14. In one aspect, as shown in FIG. 1B, one or more proximity sensors 40 may be positioned on the right and left sides of the front portion of hopper 14, for example, toward the front edge of hopper 14. As shown in FIGS. 1B and 2, one or more proximity sensors 40 may be positioned on the right and left sides of a backplate or rear portion of machine 10. Alternatively or additionally, as shown in FIG. 2, one or more proximity sensors 40 may be positioned on the right and left sides of auger 16, as auger 16 may be wider than machine 10. Moreover, in some aspects, one or more proximity sensors 40 may be positioned on front and/or rear faces (e.g., bumpers) of machine 10. For example, one or more proximity sensors 40 on a front bumper of machine 10 may help ensure machine 10 does not contact a door or back wall of a container (e.g., once machine 10 is within the container), and/or does not contact another machine already loaded into the container. Additionally, one or more proximity sensors 40 on a rear bumper of machine 10 may help prevent unintended contact between machine 10 and a portion of the container and/or another machine within the container in an instance where machine 10 is driven in reverse into the container (e.g., such that machine 10 may be driven forward out of the container, operator preference, efficiently positioning machine 10 within the container and/or relative to other machines or objects within the container, etc.)

As discussed below, proximity sensors 40 may be activated during a containerization procedure, for example, when machine 10 is being loaded into (or unloaded from) a container. For example, proximity sensors 40 may be inactive during a work operation (e.g., paving) or otherwise positioning machine 10.

Proximity sensors 40 may be cameras, radar sensors, sonar sensors, etc. to measure and/or determine a position of machine 10 or portions of machine 10 relative surrounding elements. Proximity sensors 40 may emit one or more signals (e.g., light, radio waves, sound waves, etc.). Based on the received reflected signals from an object or surface, proximity sensors 40 may determine a distance between the sensor 42 and the object or surface, and thus a distance between machine 10 and the object or surface. In one aspect, proximity sensors 40 may be optical or laser distance sensors, and may detect distances between proximity sensors 40 and other objects or surfaces. In another aspect, proximity sensors 40 may be magnetic proximity sensors, and may detect distances between proximity sensors 40 and one or more metallic and/or magnetic objects or surfaces. In these aspects, the one or more proximity sensors 40 may also allow machine 10 to measure a distance from one or more proximity sensors 40 or machine 10 to a wall of a container 50, as shown in FIG. 2.

The one or more proximity sensors 40 are in communication with (e.g., operatively coupled to) controller 102, and the one or more proximity sensors 40 may also be in communication with any other proximity sensors 40 or other sensors on machine 10 in order to compare the information regarding the surroundings obtained from the plurality of proximity sensors 40. In one aspect, a plurality of proximity sensors 40 may be used to create a three-dimensional point cloud of the surroundings of machine 10. As such, one or more proximity sensors 40 may help machine 10 maintain a desired distance or position relative to one or more objects or surfaces, for example, relative to one or more walls or other portions of a shipping container.

Furthermore, machine 10 may include one or more illumination devices 42. Illumination devices 42 may be standard lights on machine 10 (e.g., lights that illuminate during a driving mode) or may be supplemental lights coupled to various portions of machine 10. As shown in FIGS. 1A and 1B, one or more illumination devices 42 may be positioned on the front and/or rear portions of machine 10, and may be positioned on the right and/or the left sides of machine 10. In one aspect, as shown in FIG. 1B, machine 10 includes one illumination device in a front right portion, a front left portion, a rear right portion, and a rear left portion. Machine 10 may also include one or more illumination devices 42 in central portions, on one or more sides of machine 10, for example, aligned with operator station 20 and/or with engine assembly 22. As discussed below, illumination devices 42 may be controlled by controller 102. For example, illumination devices 42 may be illuminated during a containerization mode, and may be deactivated when the containerization mode is disabled and/or after a period of time after the initiation or disabling of the containerization mode.

FIG. 2 illustrates machine 10 being loaded into a container 50, for example, an intermodal shipping container (i.e., a large standardized shipping container designed for multiple modes of transportation). Container 50 may be a standard size, for example, either 8 feet 6 inches or 9 feet 6 inches high, and 8 feet wide. Container 50 may be formed of a hard, rugged metal, for example, corrugated steel. Container 50 may include a door 52 on and end of container 50, or may include doors 52 on two ends of container 50. Machine 10 may be loaded through door 52, but, as shown, there may not be much room on the sides of machine 10 when passing though door 52 and/or within container 50. Accordingly, it is important to avoid machine 10 contacting the interior of container 50 during a loading or unloading process. Moreover, container 50 may be long (e.g., 20 or 40 feet long), and may not include internal illumination. Accordingly, even with door(s) 52 on the ends of container 50 open, there is likely limited visibility inside container 50, especially once machine 10 is loaded into container 50. Additionally, as shown in FIG. 2, with machine 10 loaded into container 50, there may be very little extra space or clearance on the sides or machine 10 (e.g., approximately 1 inch, approximately one half inch, approximately one quarter inch, etc.). In one aspect, after loading machine 10 into container 50, machine 10 may be secured within container 50 via cables or straps, and illumination may help one or more operators to secure the cables or straps. Similarly, in an unloading process, illumination may be helpful for one or more operators to disassemble the cables or straps such that machine 10 may be unloaded from container 50.

Figure 3:
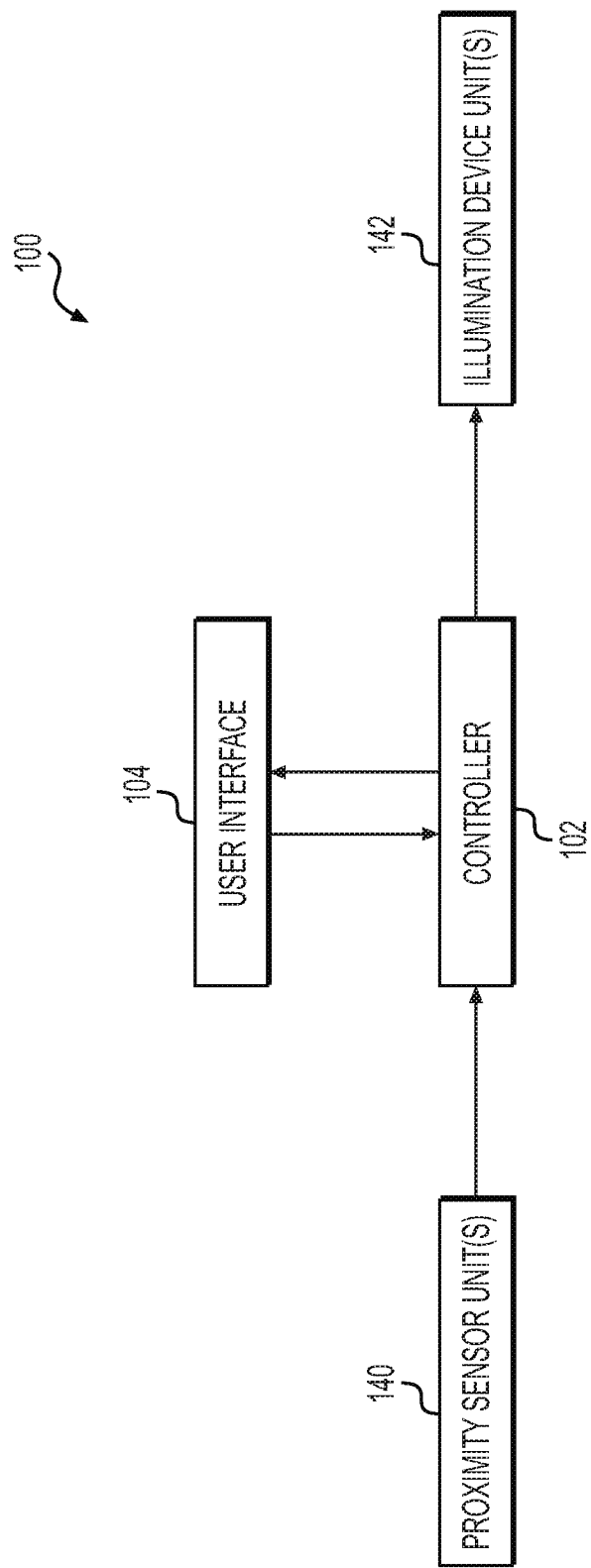
FIG. 3 is a schematic view of a portion of the exemplary machine of FIG. 1, according to aspects of this disclosure.

FIG. 3 illustrates an exemplary schematic view of a control system 100 of machine 10. Control system 100 may include one or more controllers 102 in communication with the one or more sensor and/or control units. The communication may be wired or wireless, for example, via Bluetooth®, Wi-Fi, radio frequency, etc. Controller 102 may be a separate controller on machine 10 or may be integrated into a central machine controller (e.g., a main machine control module). Alternatively, controller 102 may be integrated into a steering controller, an engine control module, or another control module on machine 10.

As shown in FIG. 3, controller 102 may be in communication with one or more proximity sensor units 140, with each proximity sensor unit 140 being coupled to or incorporated within proximity sensors 40 positioned at various positions on machine 10 (e.g., front right, front left, rear right, and rear left sides of machine 10). It is noted that machine 10 and control system 100 may include any number of proximity sensors 40 and proximity sensor units 140 in order to accurately detect and measure the position of machine 10 relative to the surroundings.

Controller 102 also may be in communication with one or more illumination device units 142, with each illumination device unit 142 being coupled to or incorporated within illumination devices 42 positioned at various positions on machine 10 (e.g., front right, front left, rear right, and rear left sides of machine 10). It is noted that machine 10 and control system 100 may include any number of illumination devices 42 and illumination device units 142 in order to help illuminate machine 10 and/or the surroundings.

Controller 102 may be in communication with a display and/or input device, for example, a user interface 104, in order to receive operator input, display sensed information, signal alerts or notifications, etc. User interface 104 may include a display and a user input device, such as, for example, one or more of buttons, switches, touch screens, keyboards, joysticks, etc. User interface 104 may be incorporated in control panel(s) 36 or otherwise positioned on machine 10. Alternatively or additionally, one or more user interfaces 104 may be remote to machine 10, for example, a tablet, laptop, or a handheld device carried by an operator and/or positioned in a central control station for a site.

User interface 104 may display the position of machine 10 relative to container 50 via proximity sensor unit 142, for example, visually with a representation of machine 10 and container 50 on user interface 104. Alternatively or additionally, user interface 104 may display respective distances of various portions of machine 10 from a portion of container 50, for example, a distance from the front right portion of machine 10 to a wall and a distance from the front left portion of machine to another wall. Furthermore, user interface 104 may display a distance from the front right portion of machine 10 to a wall and a distance from the rear right portion of machine to the wall. In another aspect, user interface may display measured distances from each of proximity sensors 40 (e.g., front right, front left, rear right, and rear left sides of machine 10). The display(s) may change color based on the distances relative to a threshold distance (e.g., green above a threshold, yellow nearing a threshold, red below a threshold, etc.). The display(s) may visually, audibly, or otherwise indicate an alert if one or more of the measured distances is below the threshold distance. Similarly, user interface 104 may indicate whether a measured distance is changing at a rate outside of a predetermined acceptable rate. Moreover, user interface 104, for example, via controller 102, may control one or more illumination device unit 142 and thus control the illumination of one or more illumination devices 42.

Although not shown, controller 102 may be in communication with additional sensors mounted to or within machine 10, for example, an odometer, a speedometer, temperature sensors, etc. Additionally, controller 102 may be in communication with additional displays or operator stations, for example, a central control station for a site, an electronic log that records the positions and other operational aspects of machine 10, etc.

It is noted that control system 100 may be and/or include one or more modular units. For example, one or more of proximity sensors 40, proximity sensor units 140, control panel 36, user interface 104, illumination devices 42, illumination device units 142, etc. may be removably coupled to machine 10. In this aspect, control system 100 may be couplable to different machines 10. Control system 100 may be a stand-alone system, for example, that does not require or otherwise rely on information (e.g., signals, inputs, outputs, etc.) and/or power from machine 10. Alternatively, control system 100 may be couplable (e.g., through a wired or wireless connection) to one or more components of machine 10, for example, to control panel 36 to receive information about machine 10 and/or power from machine 10. Furthermore, control system 100 may be coupled to machine 10 for a loading or unloading procedure, and may then be removed from machine 10 (e.g., not included on machine 10 when delivered and/or sold to a purchaser). For example, control system 100 may be coupled to machine 10 for a loading procedure, and then removed from machine 10 once loaded into container 50. Control system 100 may then be coupled to another machine, and the other machine may then be loaded into container 50 or another container. Moreover, control system 100 (or another control system) may be coupled to machine 10 when machine 10 is being unloaded, for example, at another site. After machine 10 has been unloaded, control system 100 may be removed from machine 10.

Figure 4:
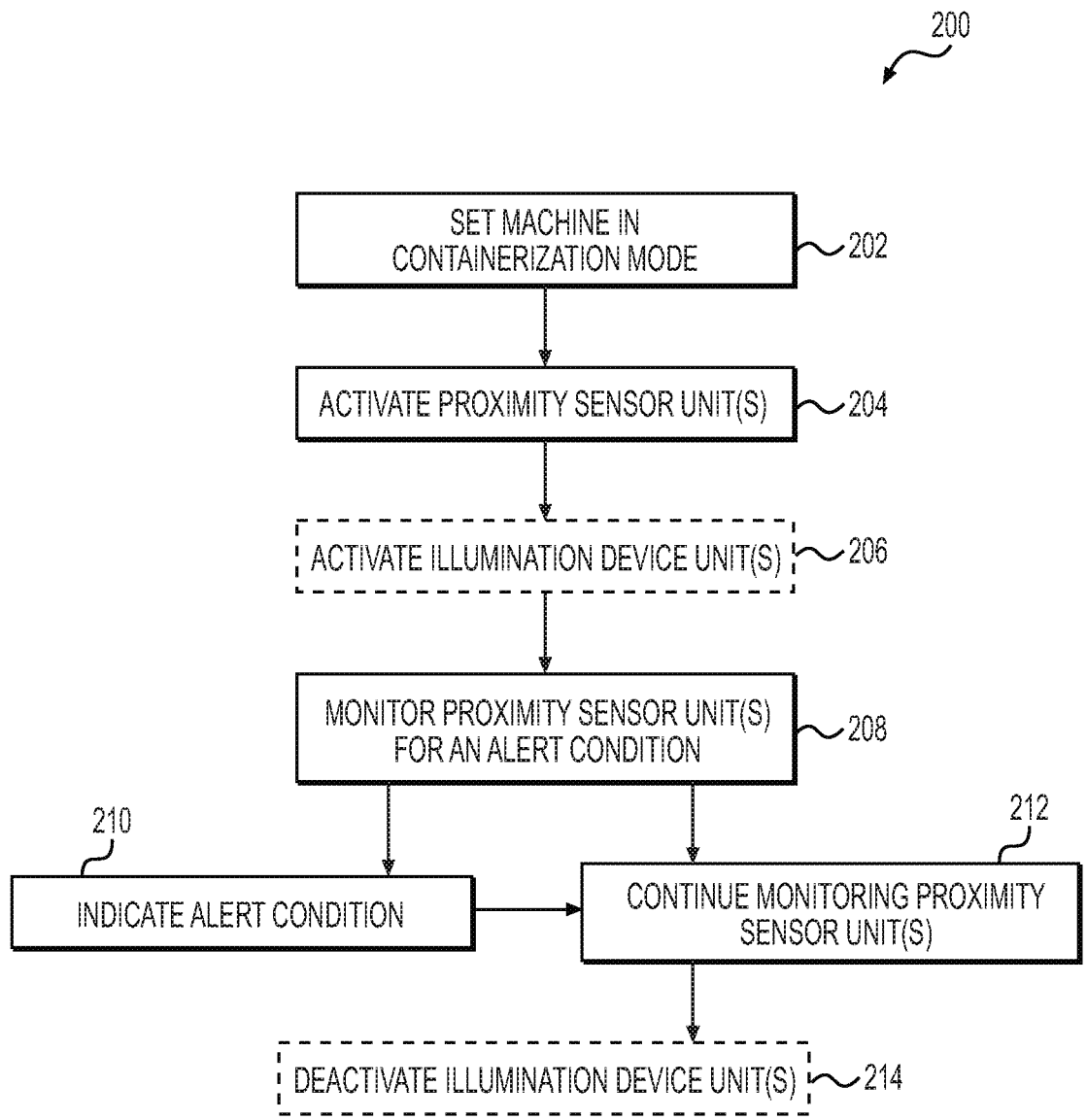
FIG. 4 provides a flowchart depicting an exemplary method for containerizing the exemplary machine, according to aspects of this disclosure.

FIG. 4 is a flow diagram portraying an exemplary method 200 that may be performed by control system 100 to help load machine 10 into container 50. Method 200 includes a step 202, where machine 10 may be set in a containerization mode (e.g., for loading machine 10 into container 50). For example, user interface 104 may receive a user input or otherwise signal the containerization mode. Although the below discussion focuses on loading machine 10 into container 50, this disclosure is not so limited. For example, the containerization mode and method 200 may also be used when unloading machine 10 from container 50 or otherwise positioning machine 10 in small and/or dark spaces or structures.

Method 200 also includes a step 204, in which controller 102 activates one or more proximity sensor units 140. For example, controller 102 may activate all of proximity sensor units 140 in order to activate all of proximity sensors 40. Alternatively, controller may activate a subset of proximity sensor units 140, for example, activate proximity sensors 40 on the sides of a front portion of machine 10, activate proximity sensors 40 at on the sides of a rear portion of machine 10, activate proximity sensors 40 on one side of machine 10, etc. Method 200 also may include a step 206, in which controller 102 activates one or more illumination device units 142. For example, controller 102 may activate all of illumination device units 142 in order to activate all of illumination devices 42. Alternatively, controller may activate a subset of illumination device units 142, for example, activate illumination devices 42 at the front of machine 10, activate illumination devices 42 at the rear of machine 10, activate illumination device 42 on one side of machine 10, etc. It is noted, however, that method 200 may be performed without step 206.

Once controller 102 has activated one or more proximity sensor units 140, method 200 includes a step 208 in which a controller (e.g., controller 102) monitors the one or more proximity sensor units 140 for an alert condition. In this aspect, proximity sensor units 140 may monitor distances between sides of machine 10 and, for example, inner walls of container 50. For example, an alert condition may exist if one or more proximity sensor units 140 indicates that one or more proximity sensors 40 are below a threshold distance relative to an object or surface (e.g., a wall of container).

The threshold distance may be, for example, approximately 1 inch, approximately one half inch, approximately one quarter inch, etc. The threshold distance may be user-selected (e.g., via user interface 104) or may be machine-specific, for example, may depend on machine 10, container 50, various structures or accessories coupled to machine 10, etc. In this aspect, the threshold distance may be user-input and/or based on the specific machine 10. Control system 100 may be couplable to a variety of machines 10, and the threshold distance(s) may vary from machine to machine based on the width, length, shape, etc. of each machine. For example, an asphalt paver may have different threshold distances than an asphalt compactor. In one aspect, an operator may input the type of machine 10 and/or one or more other details of machine 10 (e.g., model, accessories coupled to machine 10, etc.) via user interface 104, and controller 102 may automatically select the appropriate threshold distance(s) for machine 10. Moreover, the threshold distances may vary between proximity sensors 40 based on the positions of proximity sensors 40. In this aspect, for example, proximity sensors 40 positioned on sides of machine 10 may have a smaller threshold distance than proximity sensors 40 on a front end or rear end of machine 10. Alternatively, proximity sensors 40 positioned on sides of machine 10 may have a larger threshold distance than proximity sensors 40 on a front end or rear end of machine 10.

It is noted that the threshold distance(s) may be much smaller than existing collision avoidance systems. Alternatively or additionally, an alert condition may exist if one or more proximity sensor units 140 indicate that machine 10 is not entering and/or traveling in a straight-line relative to container 50. For instance, an alert condition may exist if a distance measured by one proximity sensor 40 relative to an interior of container 50 changes as machine 10 travels within container 50. In this circumstance, for example, if machine 10 is veering to the right relative to container 50, one proximity sensor 40 on the right side of the front portion of machine 10 may indicate a decreasing distance between the sensor and a wall of container 50. Similarly, another sensor 40, for example, one proximity sensor 40 on the left side of the front portion of machine 10, may indicate an increasing distance between the sensor and another wall of container 50. Additionally, one proximity sensor 40 on the right side of the front portion of machine 10 and one proximity sensor 40 on the right side of the rear portion of machine 10 measuring different distances may be indicative of machine 10 veering to the right or left relative to container 50.

Furthermore, controller 102 may monitor the measured distances of one or more proximity sensors 40, and may determine whether the measured distances are changing at a rate outside of a predetermined acceptable rate.

If an alert condition is detected, method 200 proceeds to step 210 in which control system 100 indicates the alert condition. The alert condition(s) may be displayed on user interface 104, for example, as a part of control panel 36. As mentioned, user interface 104 may include indicators that may change color based on the distances (e.g., green above a threshold, yellow nearing a threshold, red below a threshold, etc.), may visually (e.g., a flashing light), audibly (e.g., an alarm), or otherwise indicate an alert if one or more measured distance is below a threshold. In one aspect, although not shown, controller 102 may also be coupled to a braking system and/or a steering system in order to apply a brake to stop machine 10 and/or steer machine 10 in response to the alert condition. Additionally, control system 100 may include a memory (not shown) to record one or more thresholds for machine 10 (e.g., which may be user-input and user-modifiable or preprogrammed and not modifiable). In another aspect, the memory may record instances of alert condition(s) being observed, any operator action in response to the alert condition(s), etc.

If an alert condition is not detected, then method 200 proceeds to step 212 in which controller 102 continues to monitor proximity sensor units 140. Moreover, if an alert condition is detected and method 200 proceeds to step 210, but the alert condition is remedied (e.g., by a steering correction), method 200 may also proceed to step 212. Method 200 may repeat steps 210 and 212 as many times as necessary until the loading is complete.

Furthermore, method 200 may also include an optional step 214 in which controller 102 deactivates illumination device units 142, for example, to deactivate illumination devices 42. In one aspect, step 214 may deactivate illumination device units 142 after a certain period of time, for example, approximately 20 or 30 minutes, after the initiation of the containerization mode, after machine 10 has stopped moving, etc. In this aspect, machine 10 may be loaded into and secured within container 50. Then, illumination device units 142 may be deactivated automatically, such that illumination devices 42 are not illuminated after machine 10 is loaded and secured within container 50, reducing drain on a power supply, increasing the lifetime of illumination device 42, etc.

Moreover, in one aspect, optional step 206 may be performed after step 212. In this aspect, after machine 10 has been loaded into container 50, illumination device units 142 may then be activated. As mentioned, controller 102 may activate all of illumination device units 142 in order to activate all of illumination devices 42. Alternatively, controller may activate a subset of illumination device units 142, for example, activate illumination devices 42 at the front of machine 10, activate illumination devices 42 at the rear of machine 10, activate illumination device 42 on one side of machine 10, etc. In this aspect, illumination devices 42 may help the operator(s) secure machine 10 within container. As mentioned above, step 214 may then be performed to automatically deactivate illumination device 42 after a period of time.

INDUSTRIAL APPLICABILITY

The disclosed aspects of machine 10, control system 100, and method 200 may be used in any machine to assist in loading, securing, unloading, etc. the machine into container 50 or otherwise positioning the machine in a small and/or dark space or structure. For example, when machine 10 is being loaded into container 50, an operator may signal control system 100 to set machine 10 in a containerization mode in step 202. Step 202 may include user input via user interface 104. Control system 100 may then activate one or more proximity sensor units 140 in step 204, optionally activate illumination device unit 142 in step 206, and monitor the active proximity sensor units 140 in step 208. In one aspect, if an alert condition is detected, the alert may be displayed on user interface 104 or otherwise indicated to an operator in step 210.

As a result, one or more operators may load (or unload) machine 10 into container 50 more easily and efficiently. Control system 100 and the features discussed herein may help prevent machine 10 from contacting the interior of container 50 during a loading or unloading process, which may reduce the risk of damage to machine 10 and/or the need to repair, repaint, etc. after delivery (and unloading) of machine 10. Control system 100 and the features discussed herein may reduce the number of operators necessary to position machine 10, as one operator may monitor the position of machine 10 relative to container 50 (either in operator station 20 or remote from machine 10), rather than requiring individuals at each corner of machine 10 during the containerization process. Control system 100 and the features discussed herein may also help to improve the efficiency for loading and/or unloading machine 10 into and out of container 50. Moreover, control system 100 and the features discussed herein may reduce the risk of injury, as individuals are not required to be near machine 10 to monitor the position of machine 10 within container 50. For example, in an aspect where more than one machine 10 is being loaded into container 50, a first machine may be driving to a back wall of container 50, and control system 100 may allow for the first machine to be appropriately positioned without a need for an individual to be positioned near the back wall. Furthermore, a second machine may then be driven to a position near the first machine, and control system 100 may allow for the second machine to be appropriately positioned without a need for an individual to be positioned between the first machine and the second machine.

Additionally, illumination devices 42 may help the operator(s) position machine 10, and also may help the operator(s) secure machine 10 within container 50. As mentioned above, illumination device 42 may automatically turn off, which may reduce the drain on a power supply, increase the lifetime of illumination device 42, etc. As mentioned above, one or more portions of control system 100 may be modular and may be removed before delivery to a purchaser, which may help to reduce the overall cost of machine 10, may help efficiently and effectively load machine(s) 10 into container 50 and/or unload machine(s) 10 from container 50, etc.

It will be apparent to those skilled in the art that various modifications and variations can be made to the disclosed machine without departing from the scope of the disclosure. Other embodiments of the control system for a machine will be apparent to those skilled in the art from consideration of the specification and practice of the control system for a machine disclosed herein. It is intended that the specification and examples be considered as exemplary only, with a true scope of the disclosure being indicated by the following claims and their equivalents.

What is claimed is:

1. A control system for a machine, comprising:
a machine;
a plurality of proximity sensors coupled to the machine; and
a controller in communication with the plurality of proximity sensors,
wherein the controller is configured to activate and monitor proximity information from the proximity sensors during a containerization mode and indicate an alert if the proximity information is below a threshold distance, wherein the containerization mode corresponds to loading the machine into a container or unloading the machine from the container.

2. The control system of claim 1, further comprising a user interface, wherein the user interface is coupled to the controller, wherein the user interface is configured to receive user input indicative of an activation of the containerization mode, wherein in response to the user input indicative of the activation of the containerization mode, the controller activates and monitors the proximity sensors, and wherein the controller is configured to display the monitored proximity information to the user interface.

3. The control system of claim 2, wherein the monitored proximity information is displayed in a first color when above the threshold distance and in a second color when below the threshold distance.

4. The control system of claim 2, wherein the controller is configured to activate an audible alert when the monitored proximity information is below the threshold distance.

5. The control system of claim 1, wherein the plurality of proximity sensors includes optical proximity sensors or magnetic proximity sensors.

6. The control system of claim 1, wherein the plurality of proximity sensors includes a front right proximity sensor coupled to a right side of a front portion of the machine, a front left proximity sensor coupled to a left side of the front portion of the machine, a rear right proximity sensor coupled to a right side of a rear portion of the machine, and a rear left proximity sensor coupled to a left side of the rear portion of the machine, and wherein at least one proximity sensor of the plurality of proximity sensors is positioned on a widest portion of the machine.

7. The control system of claim 6, wherein the plurality of proximity sensors are removably coupled to the machine.

8. The control system of claim 1, further including a plurality of illumination devices configured to be activated in response to an activation of the containerization mode.

9. The control system of claim 8, wherein the plurality of illumination devices includes a front right illumination device coupled to a right side of a front portion of the machine, a front left illumination device coupled to a left side of the front portion of the machine, a rear right illumination device coupled to a right side of a rear portion of the machine, and a rear left illumination device coupled to a left side of the rear portion of the machine.

10. The control system of claim 9, wherein the controller activates the illumination devices in response to a signal to set the machine in the containerization mode; and
wherein the controller automatically deactivates the plurality of illumination devices after a period of time.

11. A control system for a machine, comprising:
a plurality of proximity sensors; and
a controller operatively coupled to each of the plurality of proximity sensors,
wherein, in response to an activation of a containerization mode signal, wherein the containerization mode signal corresponds to the machine being loaded into or unloaded from a container or other structure, the controller is configured to activate one or more of the proximity sensors and monitor information from the one or more of the proximity sensors, and wherein the controller is configured to indicate an alert if the controller detects an alert condition.

12. The control system of claim 11, wherein the controller is configured to display the monitored proximity information to an user interface relative to a threshold distance, and wherein the monitored proximity information is displayed in a first color when above the threshold distance and in a second color when below the threshold distance.

13. The control system of claim 12, wherein the controller is configured to activate an audible alert when the monitored proximity information is below the threshold distance.

14. The control system of claim 11, wherein the machine is a paving machine, and wherein the plurality of proximity sensors are positioned on sides of the machine around a periphery of the machine.

15. The control system of claim 13, wherein the plurality of proximity sensors further includes optical proximity sensors or magnetic proximity sensor.

16. A method of controlling a machine, comprising:
receiving a signal to set the machine in a containerization mode, wherein the containerization mode corresponds to loading the machine into a container or unloading the machine from the container;
activating a plurality of proximity sensors positioned on the machine;
monitoring the proximity sensors for an alert condition, wherein the alert condition includes one or more proximity sensors indicating a measured distance that is below a threshold; and
indicating the alert condition visually on a user interface.

17. The method of claim 16, further including displaying the measured distance from each of the proximity sensors on the user interface and audibly indicating the alert condition.

18. The method of claim 17, wherein the machine is a paving machine, and wherein the plurality of proximity sensors are positioned on sides of the paving machine around a periphery of the paving machine.

19. The method of claim 18, wherein the plurality of proximity sensors further includes optical proximity sensors or magnetic proximity sensors.

20. The method of claim 19, further comprising:
activating one or more illumination devices in response to the signal to set the machine in the containerization mode.

* * * * *